US011165819B2

(12) United States Patent
Reddy et al.

(10) Patent No.: US 11,165,819 B2
(45) Date of Patent: *Nov. 2, 2021

(54) AUTOMATIC RETRAINING OF MACHINE LEARNING MODELS TO DETECT DDOS ATTACKS

(71) Applicant: Cisco Technology, Inc., San Jose, CA (US)

(72) Inventors: K. Tirumaleswar Reddy, Bangalore (IN); Daniel G. Wing, San Jose, CA (US); Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,302

(22) Filed: Jun. 19, 2020

(65) Prior Publication Data

US 2020/0389489 A1 Dec. 10, 2020

Related U.S. Application Data

(63) Continuation of application No. 15/245,886, filed on Aug. 24, 2016, now Pat. No. 10,728,280.

(60) Provisional application No. 62/356,023, filed on Jun. 29, 2016.

(51) Int. Cl.
*H04L 29/06* (2006.01)
*G06N 20/00* (2019.01)

(52) U.S. Cl.
CPC ......... *H04L 63/1458* (2013.01); *G06N 20/00* (2019.01); *H04L 63/1425* (2013.01); *H04L 2463/144* (2013.01)

(58) Field of Classification Search
CPC .. G06N 99/005; G06N 20/00; H04L 63/1548; H04L 63/1425; H04L 2463/144
USPC ........................................................... 726/22
See application file for complete search history.

(56) References Cited

U.S. PATENT DOCUMENTS

| | | | |
|---|---|---|---|
| 6,301,668 | B1 | 10/2001 | Gleichauf et al. |
| 7,823,204 | B2 | 10/2010 | Gupta et al. |
| 8,635,171 | B1 | 1/2014 | Kennedy |
| 2002/0147694 | A1 | 10/2002 | Dempsey et al. |
| 2015/0067857 | A1 | 3/2015 | Symons et al. |

(Continued)

OTHER PUBLICATIONS

Internet Engineering Task Force (IETF) Internet-Draft Co-operative DDoS Mitigation draft-reddy-dots-transport-066 T. Reddy, D. Wing, P. Patil, M. Geller, Cisco, M. Boucadair, Orange Aug. 8, 2016.*

(Continued)

*Primary Examiner* — Benjamin A Kaplan
(74) *Attorney, Agent, or Firm* — Behmke Innovation Group; Jonathon P. Western; James M. Behmke

(57) ABSTRACT

In one embodiment, a device in a network receives an attack mitigation request regarding traffic in the network. The device causes an assessment of the traffic, in response to the attack mitigation request. The device determines that an attack detector associated with the attack mitigation request incorrectly assessed the traffic, based on the assessment of the traffic. The device causes an update to an attack detection model of the attack detector, in response to determining that the attack detector incorrectly assessed the traffic.

16 Claims, 13 Drawing Sheets

(56) References Cited

U.S. PATENT DOCUMENTS

| | | | |
|---|---|---|---|
| 2015/0229661 | A1 | 8/2015 | Balabine et al. |
| 2015/0254555 | A1 | 9/2015 | Williams, Jr. et al. |
| 2017/0331854 | A1 | 11/2017 | Reddy et al. |

OTHER PUBLICATIONS

Mortensen, et al., "Distributed Denial of Service (DDoS) Open Threat Signaling Requirements", Internet-Draft, <draft-ietf-dots-requirements-01>, Mar. 18, 2016, 16 pages, Internet Engineering Task Force Trust.

Dobbins, et al., "Use cases for DDoS Open Threat Signaling", Internet-Draft, <draft-ietf-dots-usecases-01.txt>, Mar. 21, 2016, 21 pages, Internet Engineering Task Force Trust.

Geller et al. "DF Client Integration with in Cisco ISR" Proof Of Concept; Feb. 2016; pp. 1-25.

94$^{th}$ IETF, DDoS Open Threat Signaling (DOTS) Working Group, Nov. 1-6, 2015 (Year:2015).

Internet Engineering Task Force (IETF) Internet-Draft, Co-operative DDoS Mitigation draft-reddy-dots-transport-06, T. Reddy, D. Wing, P. Patil, M. Geller, Cisco, M. Boucadair, Orange, Aug. 8, 2016.

* cited by examiner

AUTOMATIC RETRAINING OF MACHINE LEARNING MODELS TO DETECT DDOS ATTACKS

CROSS-REFERENCES TO RELATED APPLICATIONS

This application is a Continuation of U.S. patent application Ser. No. 15/245,886, filed on Aug. 24, 2016, entitled AUTOMATIC RETRAINING OF MACHINE LEARNING MODELS TO DETECT DDoS ATTACKS, by Reddy, et al., and claims priority to U.S. Provisional Application No. 62/356,023, filed on Jun. 29, 2016, entitled AUTOMATIC RETRAINING OF MACHINE LEARNING MODELS TO DETECT DDoS ATTACKS, by Reddy, et al., the entire contents of which are incorporated herein by reference.

TECHNICAL FIELD

The present disclosure relates generally to computer networks, and, more particularly, to automatically retraining machine learning models to detect distributed denial of service (DDoS) attacks.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
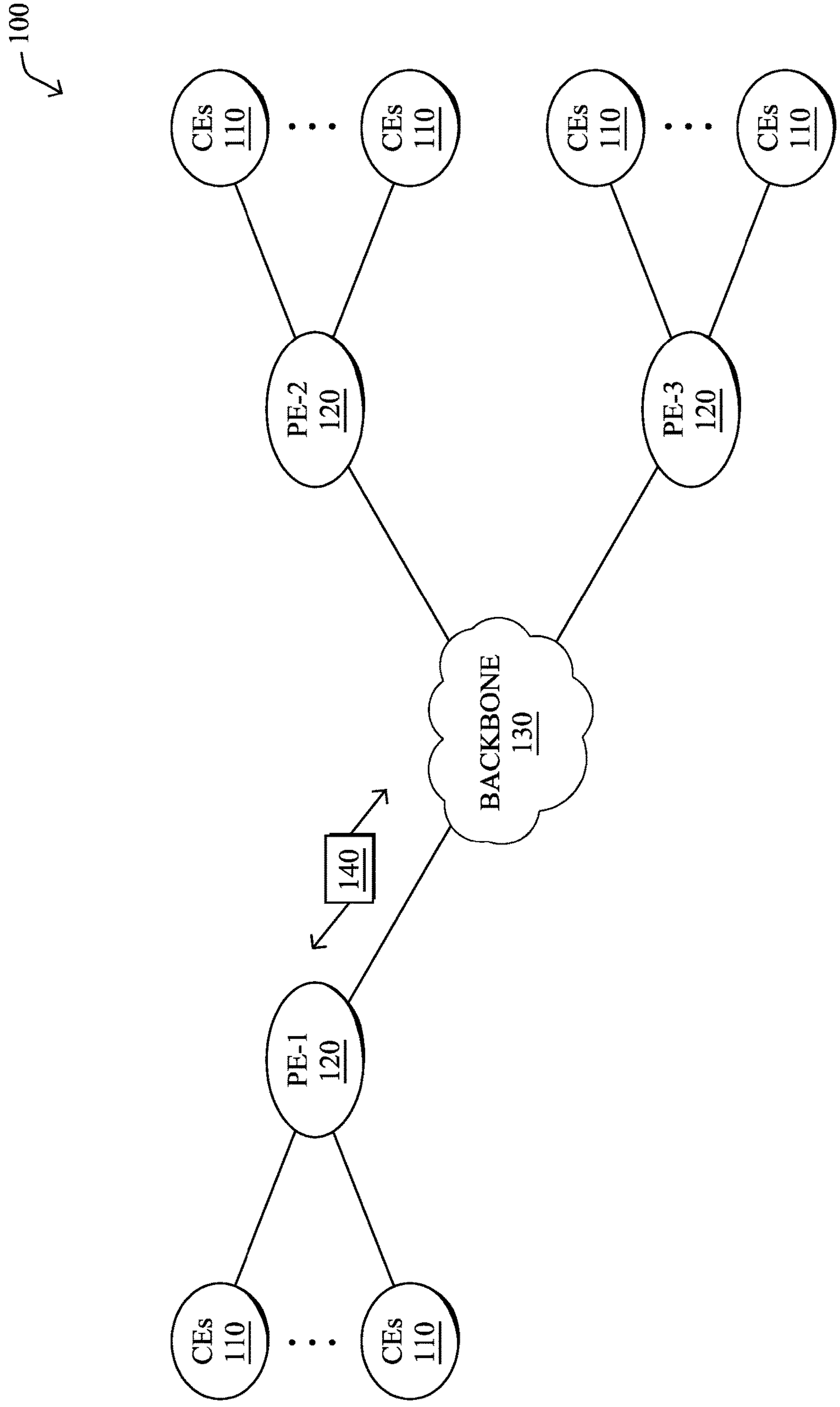
FIGS. 1A-1B illustrate an example communication network.

According to one or more embodiments of the disclosure, a device in a network receives an attack mitigation request regarding traffic in the network. The device causes an assessment of the traffic, in response to the attack mitigation request. The device determines that an attack detector associated with the attack mitigation request incorrectly assessed the traffic, based on the assessment of the traffic. The device causes an update to an attack detection model of the attack detector, in response to determining that the attack detector incorrectly assessed the traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
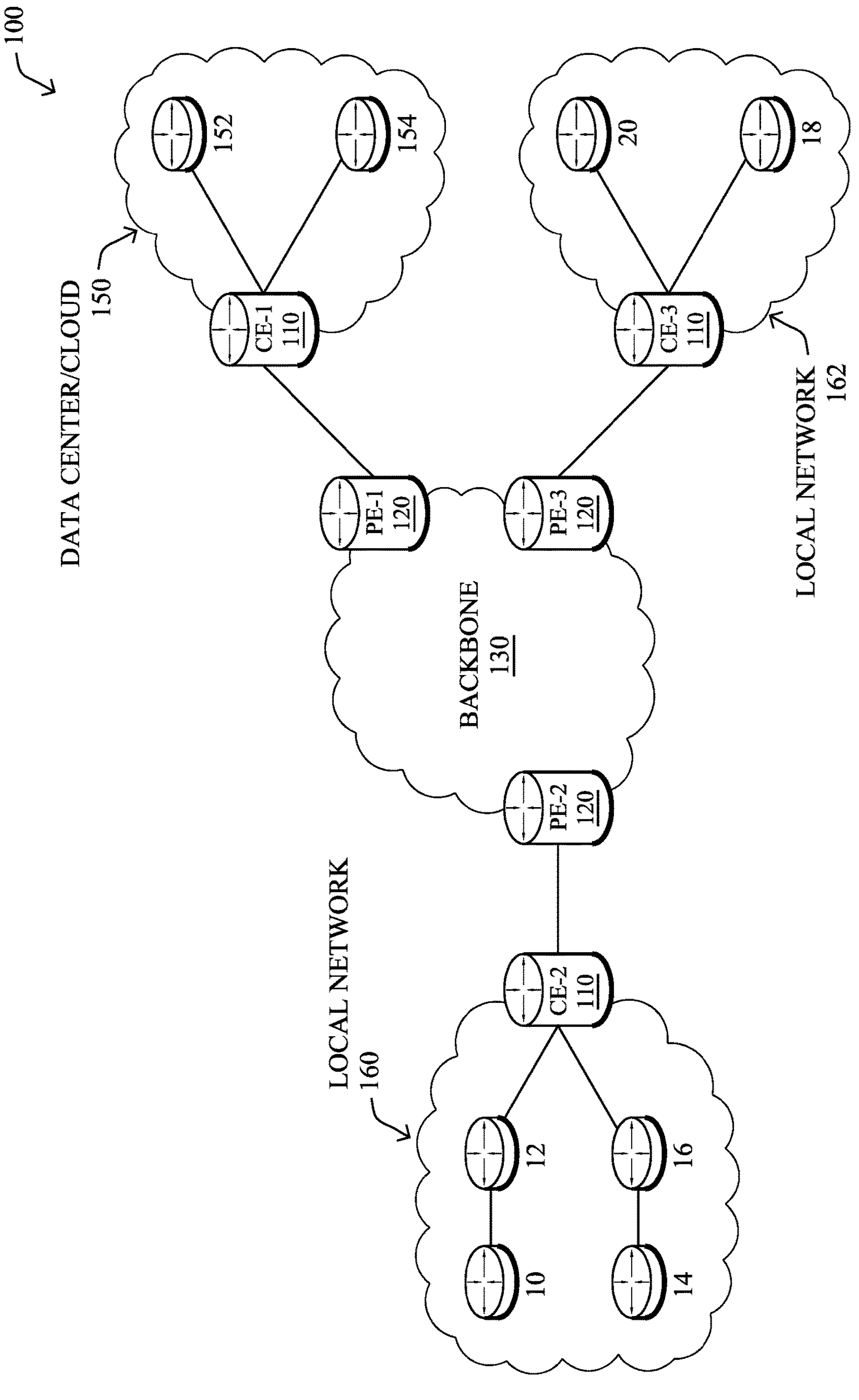

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
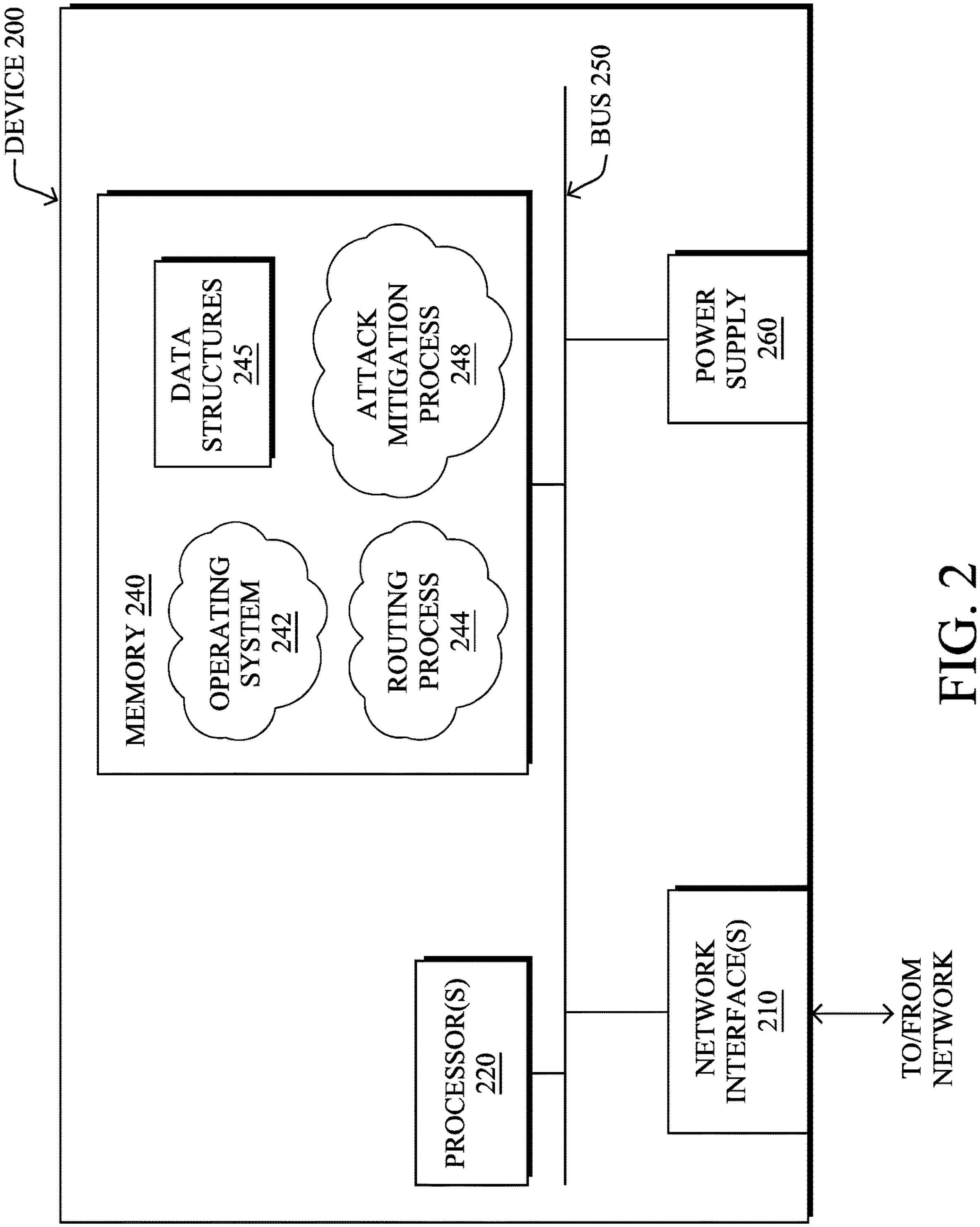
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise, illustratively, an attack detection/mitigation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Attack mitigation process 248 includes computer executable instructions that, when executed by processor(s) 220, cause device 200 to perform attack detection and mitigation functions as part of an attack detection and mitigation infrastructure within the network. One type of network attack that process 248 may detect and mitigate is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

In various embodiments, attack mitigation process 248 may employ machine learning, to detect and/or mitigate network attacks. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, attack mitigation process 248 can use the model M to classify new data points, such as information regarding new traffic flows in the network. Often, M is a statistical model, and the cost function is inversely proportional to the likelihood of M, given the input data.

Example machine learning techniques that attack mitigation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

Notably, Denial of Service (DoS) attacks are relatively easy to detect when they are brute-force (e.g. volumetric), but may be difficult to distinguish from a flash-crowd (e.g., an overload of the system due to many legitimate users accessing it at the same time), when highly distributed. This fact, in conjunction with the increasing complexity of performed attacks, makes the use of "classic" (usually threshold-based) techniques unable to detect such attacks. Machine learning techniques, however, may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

Distributed DoS (DDoS) attacks present unique challenges to a network. In some cases, the system may use DDoS Open Threat Signaling (DOTS), to coordinate defensive measures among willing peers, to mitigate attacks quickly and efficiently. An overview of the requirements of a DOTS system is provided in the Internet Engineering Task Force (IETF) Draft entitled, "Distributed Denial of Service (DDoS) Open Threat Signaling Requirements," by Mortensen et al., which is hereby incorporated by reference.

The following terminology is typically used with respect to a DOTS system:

- Attack Target—the server, service, or application under DDoS attack.
- DOTS Client/Attack Detector—a software module/network node responsible for detecting DDoS attacks and using DOTS signaling to request mitigation, etc.
- DOTS Server—a software module/network node responsible for communicating with DOTS clients and coordinating mitigation actions.
- DOTS Mitigator—a node (e.g., a network element) that is able to perform mitigation actions on attack traffic (e.g., by dropping the traffic, etc.).
- DOTS gateway: A logical DOTS agent resulting from the logical concatenation of a DOTS server and a DOTS client, analogous to a SIP Back-to-Back User Agent (B2BUA).
- DOTS Agent—any function element in a DOTS system including DOTS clients, servers, etc.

Referring now to FIGS. 3A-3E, an attack mitigation architecture 300 is shown, according to various embodiments. As shown, architecture 300 may include a data center 150 or other local network connected to an Anti-DDoS service 302 via CE router 110, CE-1. Service 302 may be, for example, a cloud-based service, a service offered by a service provider, or any other service through which traffic directed towards data center 150 flows. Notably, service 302 may include any number of routers or other networking nodes/devices 40-45 that direct traffic towards CE router 110.

Also as shown, architecture 300 may implement DOTS, to defend server 152 in data center 150 against network attacks, such as DDoS attacks. Accordingly, data center 150 may also include a DDoS Detector/DOTS client 304 that may be executed on CE-1 or another device in communication therewith. In general, DOTS client 304 is configured to assess traffic to and/or from data center 150, to detect potential network attacks. For example, DOTS client 304 may use a machine learning-based model, to determine whether the traffic is potentially related to an attack. In some cases, DOTS client 304 may also be configured to attempt to perform local mitigation of an incoming attack detected by DOTS client 304 (e.g., by dropping traffic, etc.). However, for a large-scale attack, DOTS client 304 may not have the resources to fully mitigate the attack.

As part of architecture 300, DOTS client 304 may be in communication with a DOTS server 306 using DOTS signaling, either directly through the network or via a DOTS relay (not shown). DOTS server 306, in turn, may be in communication with, and provide supervisory control over, any number of DOTS mitigator(s) 308 configured to perform attack mitigation functions.

Figure 3A:
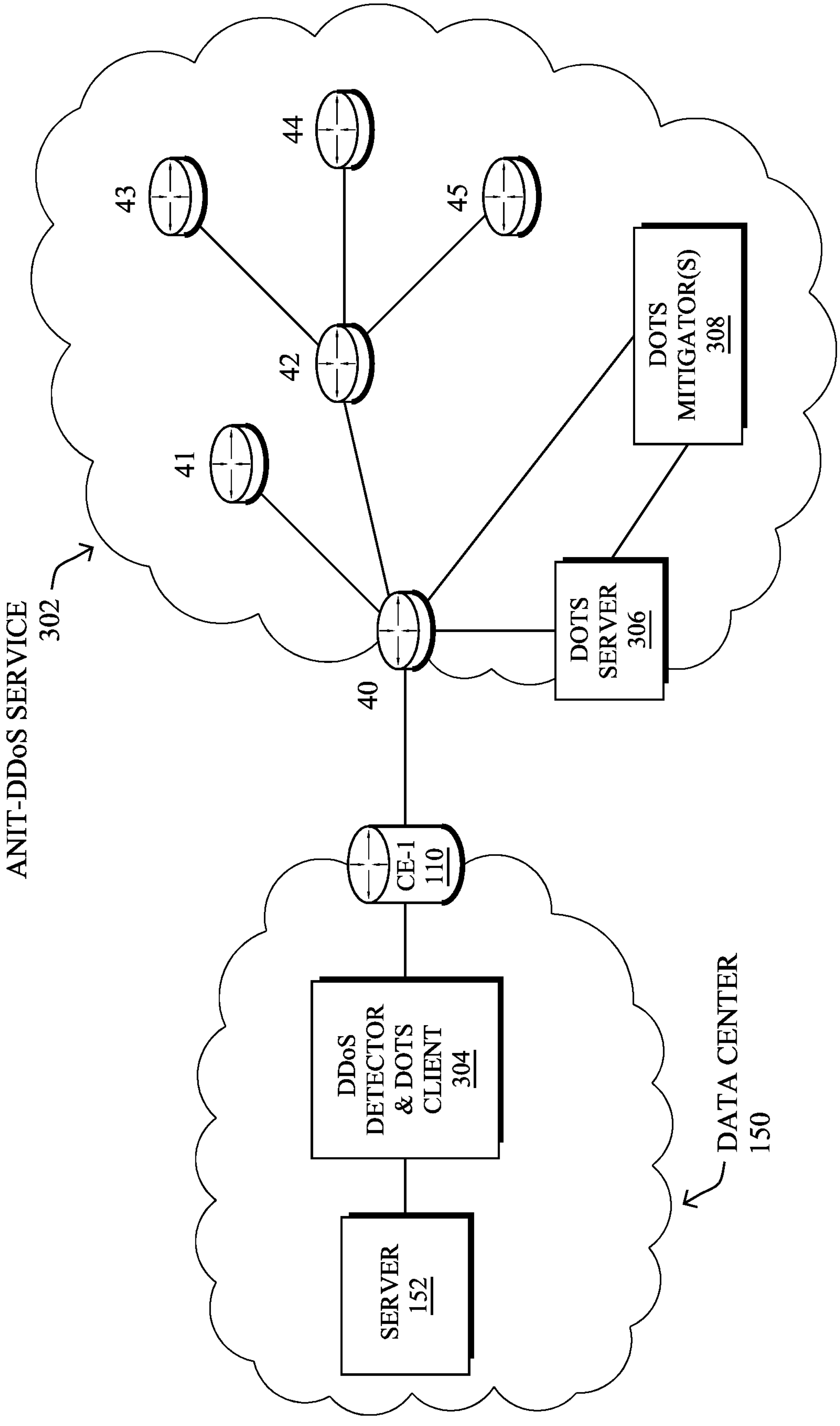
FIGS. 3A-3E illustrate an example architecture for mitigating a network attack.
Figure 3B:
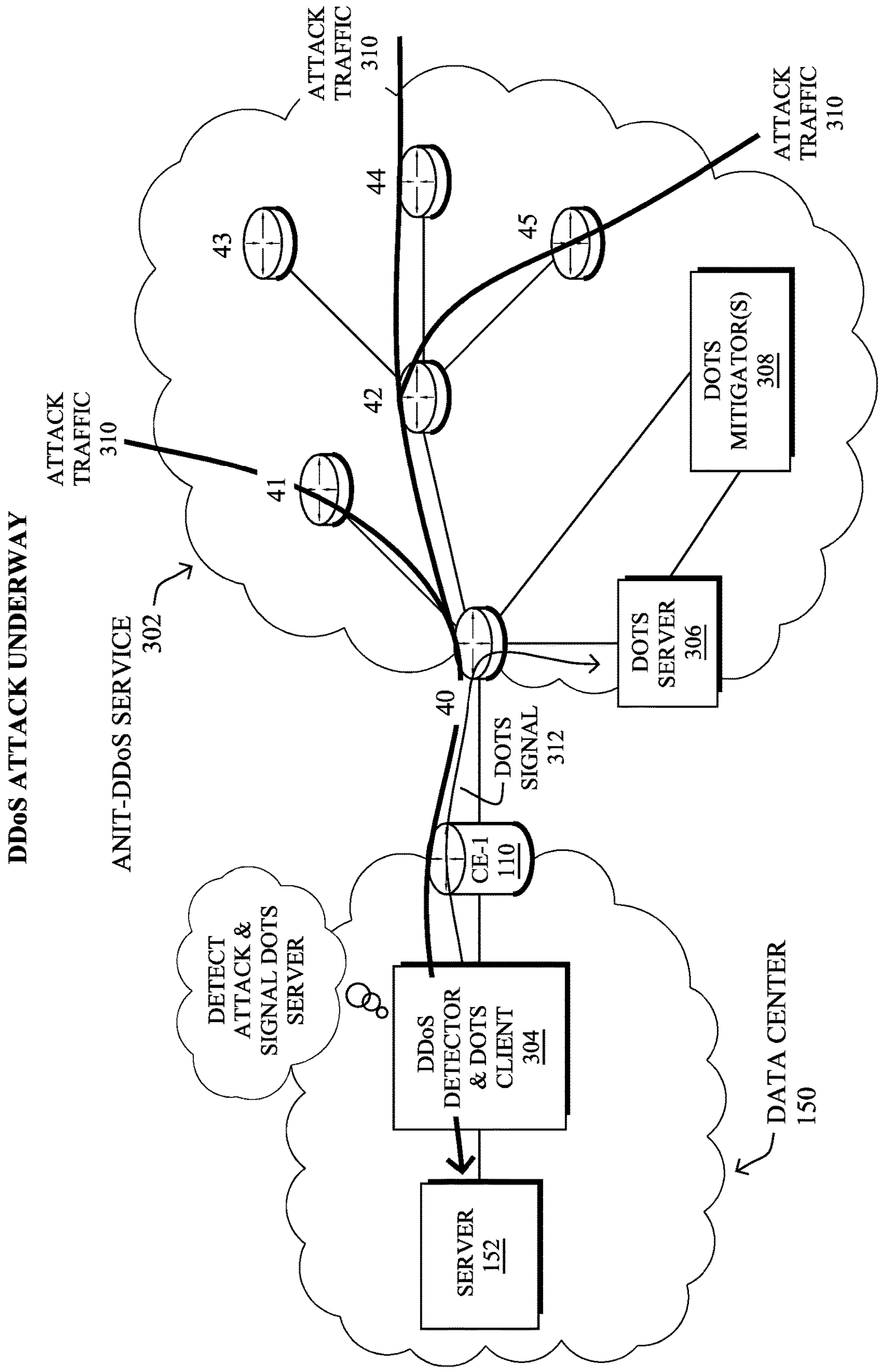

As shown in FIG. 3B, consider the situation in which a DDoS attack is underway. For example, attack traffic 310 may be routed towards the attack target, server 152 from any number of distributed attack nodes and via any number of routing paths. In such a case, DOTS client 304 may detect that an attack is underway and send a DOTS signal 312 to DOTS server 306 requesting attack mitigation.

Figure 3C:
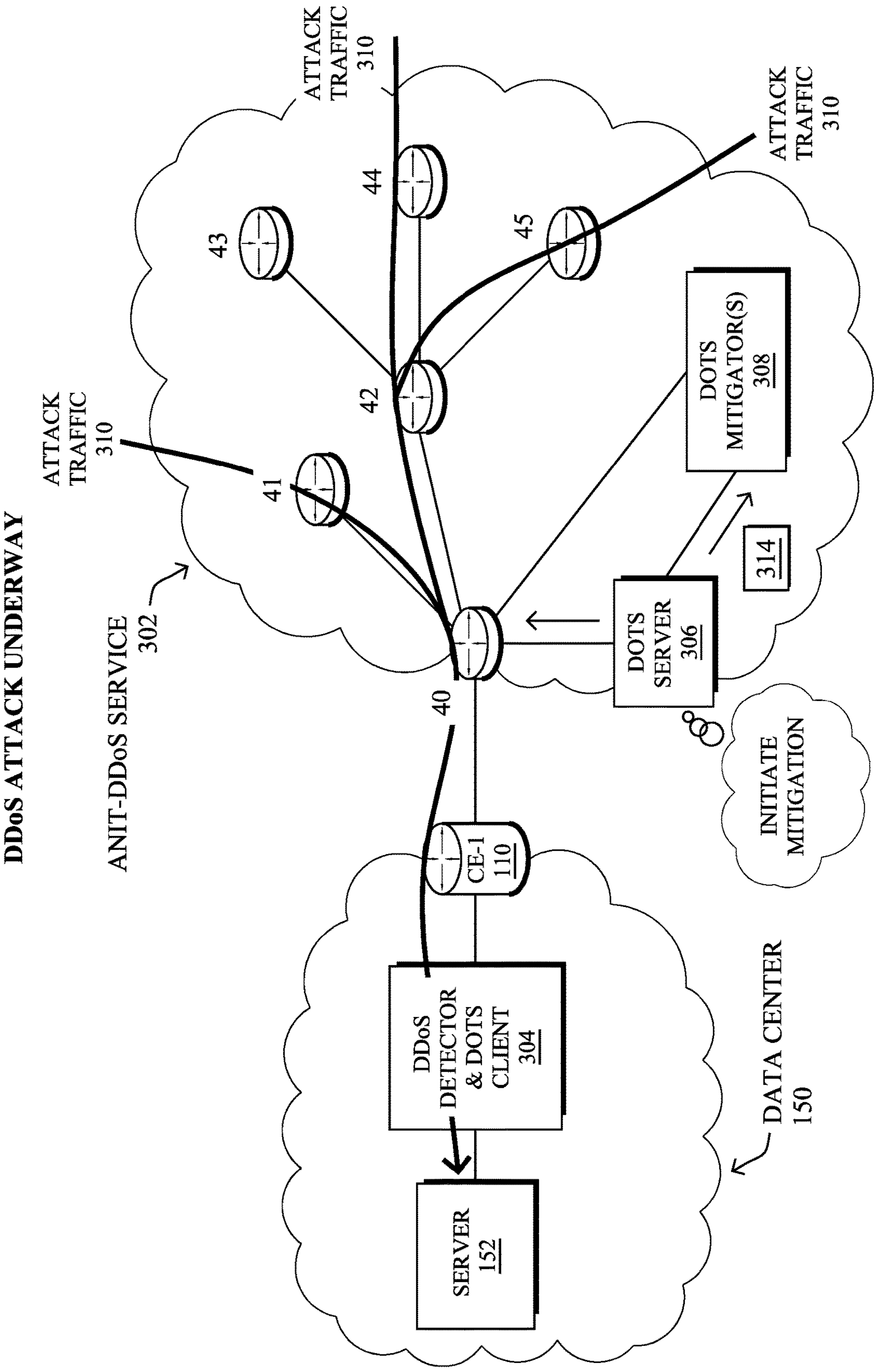

In turn, as shown in FIG. 3C, DOTS server 306 may send signal(s) 314 to DOTS mitigator(s) 308 and/or the network devices associated therewith, to divert attack traffic 310 towards DOTS mitigator(s) 308. Generally, DOTS mitigator(s) 308 may also be configured to assess network traffic to discern attack traffic and take any number of mitigation actions on the attack traffic. For example, while dropping the attack traffic is one possible mitigation strategy that may be employed by DOTS mitigator(s) 308, other strategies can be used in other implementations.

Figure 3D:
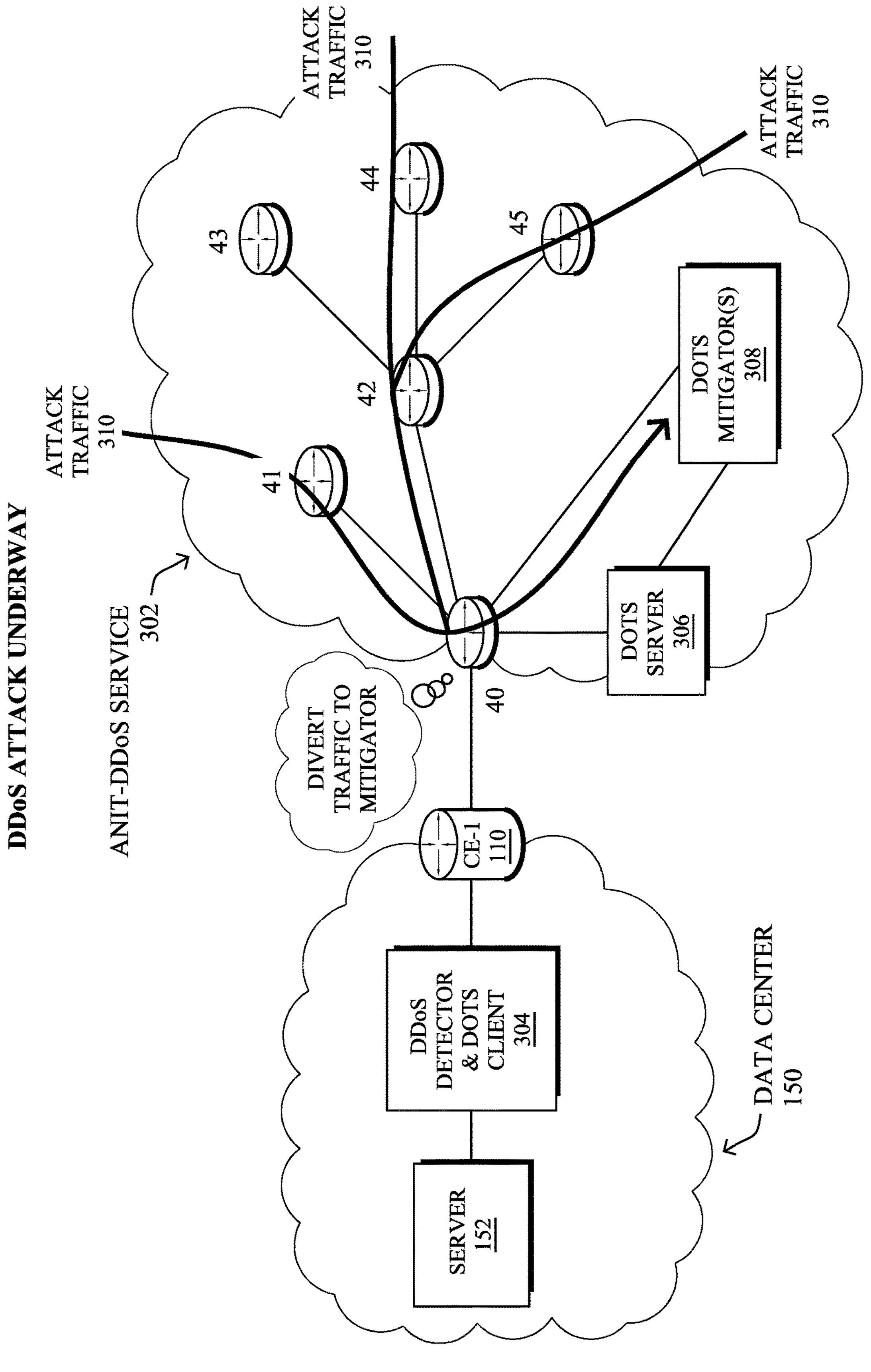

In FIG. 3D, node 40 and/or any other nodes signaled by DOTS server 306 may divert the indicated attack traffic 310 to DOTS mitigator(s) 308. As would be appreciated, node 40 may itself execute a DOTS mitigator 308, allowing node 40 to perform the analysis locally, in some cases. In other cases, node 40 may divert attack traffic 310 to another device hosting a DOTS mitigator 308.

Figure 3E:
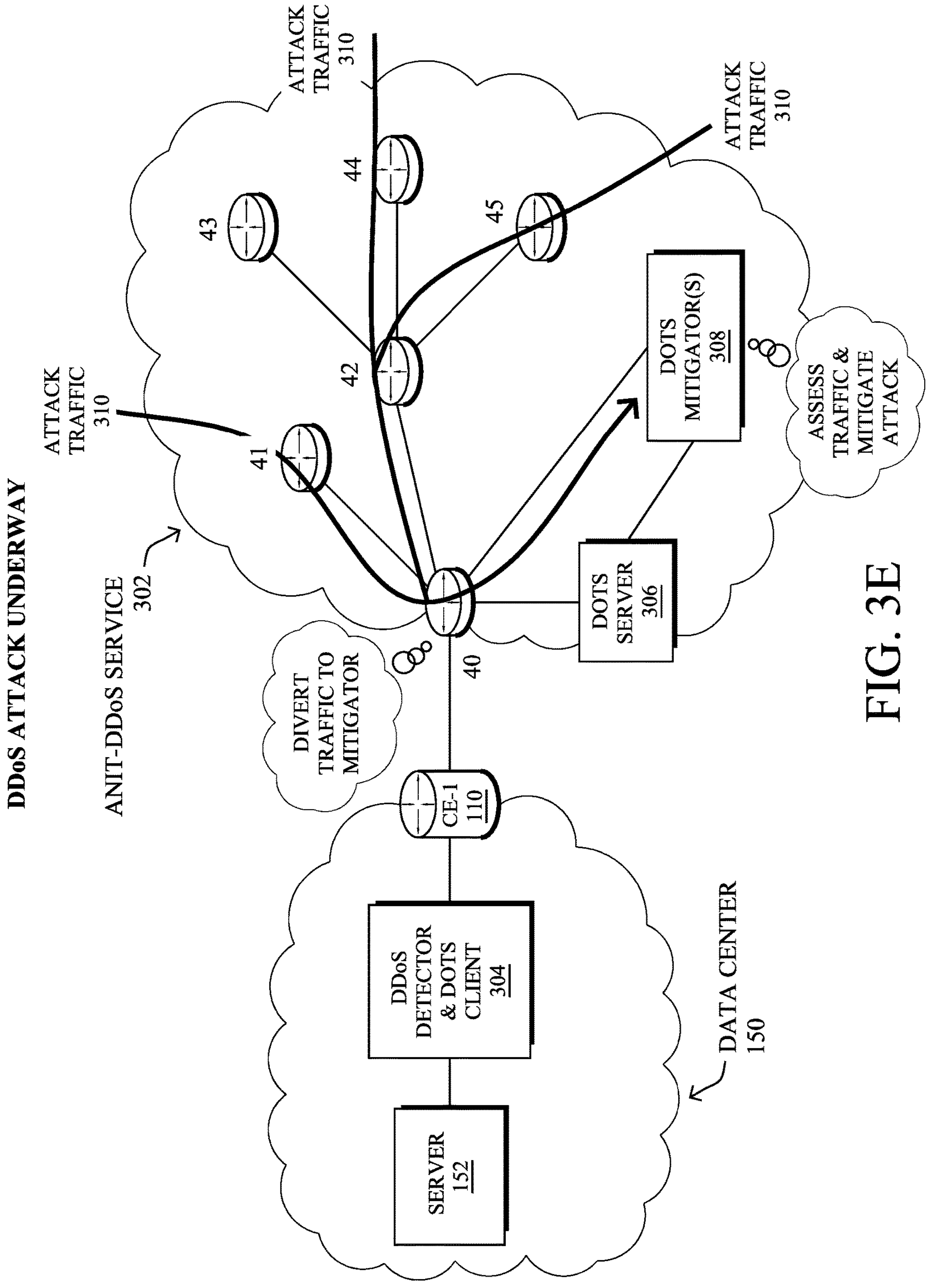

In turn, as shown in FIG. 3E, DOTS mitigator(s) 308 may assess the attack traffic 310 (e.g., using its own attack detection functions), and potentially using deeper analysis techniques than that of DOTS client 304 (e.g., a more robust attack detector, using techniques such as deep packet inspection, etc.). If DOTS mitigator(s) 308 then determine that an attack is present, based on the analysis of traffic 310, DOTS mitigator(s) 308 may perform any number of mitigation actions on traffic 310, thereby protecting server 152 from the attack. For example, a DOTS mitigator 308 may act as a Transport Layer Security (TLS) proxy, inspect the payloads of packets, detect and block attack traffic, etc. In some cases, DOTS mitigator(s) 308 may also provide feedback regarding the attack to DOTS client 304 and/or to DOTS server 306.

As noted above, a DDoS detector, such as DOTS client 304, may use lightweight mechanisms that passively monitor traffic, leveraging signatures and machine learning techniques to detect DDoS attack. For example, one type of DDoS detector may monitor IP Flow Information Export (IPFIX) and/or Netflow records, to detect DDoS attacks.

Another detector type may instead monitor whether incoming traffic is cloned or mirrored, to detect DDoS attacks. Further, if the payload of the incoming traffic is encrypted, then the DDoS detector can only rely on machine learning techniques to detect L7 DDoS attacks (like Slowloris attacks).

Machine learning-based DDoS detection has several advantages over signature based DDoS detection. In particular, machine learning techniques can detect Layer 7 (L7) DDoS attacks on encrypted flows, detect deviations from the baseline traffic (e.g., using a traffic model), and detect new/unknown attacks. Also, machine learning-based DDoS detectors are able to detect L7 attacks with a high degree of accuracy. However, such techniques are not infallible and can, in some cases, raise false alarms (i.e., false positives). In addition, as a perfect attack detector is often not achievable, the detector may occasionally "miss" the detection of an attack and label attack traffic as benign (i.e., a false negative).

Automatic Retraining of Machine Learning Models to Detect DDoS Attacks

The techniques herein propose that when a lightweight DDoS detector raises a false alarm indicating that a DDoS attack is in progress, or fails to detect an actual DDoS attack, a heavyweight DDoS mitigator automatically retrains the machine learning model of the lightweight DDOS detector without human intervention, to reduce false positives and false negatives. Such a lightweight DDoS detector may simply use machine learning for purposes of attack detection/mitigation, whereas the heavyweight DDoS mitigator may perform additional functions, such as decrypting packets with the necessary keys and examining packet payloads for L7 attacks.

Illustratively, the techniques described herein may be performed by hardware, software, and/or firmware, such as in accordance with process 248, which may include computer executable instructions executed by the processor 220 (or independent processor of interfaces 210) to perform functions relating to the techniques described herein.

Specifically, according to various embodiments, a device in a network receives an attack mitigation request regarding traffic in the network. The device causes an assessment of the traffic, in response to the attack mitigation request. The device determines that an attack detector associated with the attack mitigation request incorrectly assessed the traffic, based on the assessment of the traffic. The device causes an update to an attack detection model of the attack detector, in response to determining that the attack detector incorrectly assessed the traffic.

Figure 4A:
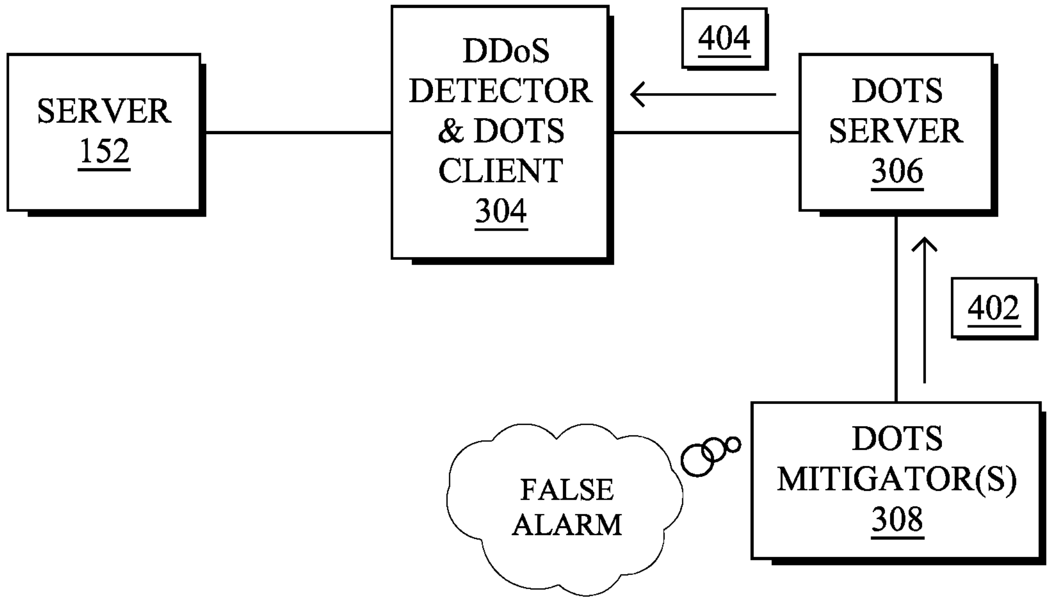
FIGS. 4A-4D illustrate examples of reducing the false positive rate of a network attack detector.

Operationally, FIGS. 4A-4D illustrate examples of reducing the false positive rate of a network attack detector, in accordance with various embodiments. As shown in FIG. 4A, consider the operations of the DOTS agents 304-308 from FIGS. 3A-3E when the lightweight attack detector, DOTS client 304 may take the following actions:

1. DOTS client 304 monitors traffic to detect DDoS attacks on server 152.
2. DOTS client 304 detects an L7 DDoS attack and conveys a DOTS signal to DOTS 304 server, to request attack mitigation.
3. DOTS server 306, in turn, instructs DOTS mitigator 304 to mitigate the attack.
4. Attack traffic destined to server 152 is diverted towards DOTS mitigator 304, such as via the border gateway protocol (BGP) or domain name system (DNS) protocol.
5. DOTS mitigator 304 acts as transparent TLS proxy, inspects the payload, and detects and blocks attack traffic.

Now, assume that DOTS client 304 raised a false alarm (e.g., a false positive), meaning that an attack on server 152 is not underway. Based on the above functionality, DOTS mitigator 304 may perform its own analysis of the traffic re-diverted to mitigator 304 before taking any mitigation actions. As noted previously, mitigator 304 may employ more heavyweight analysis techniques than that of DDoS detector/DOTS client 304, to determine whether an attack is underway. For example, mitigator 304 may perform packet inspection on the traffic, decrypt encrypted traffic, use a more computationally-expensive machine-learning model, or employ any other traffic analysis functions that were not performed by DOTS client 304.

As shown, if DOTS mitigator 304 determines that DOTS client 304 issued a false alarm (e.g., based on its own analysis of the traffic), mitigator 304 may send a message 402 back to DOTS server 306 indicating that client 304 issued a false alarm. In turn, DOTS server 306 may covey to DOTS client 304 that mitigator 304 determined that the raised alarm was a false alarm and that no attack is in progress via message 404.

Figure 4B:
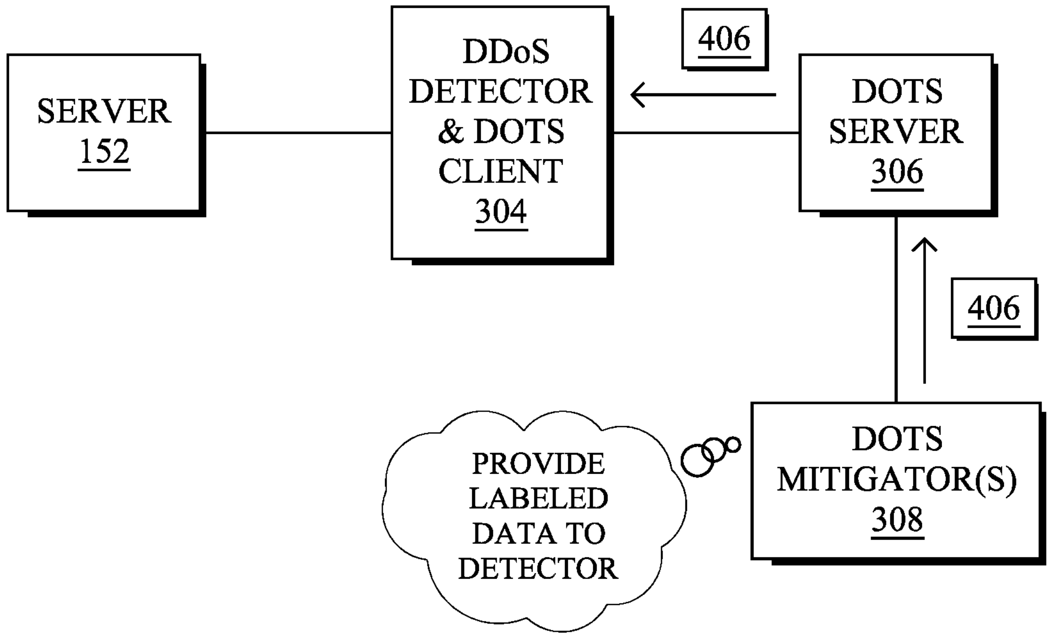

In various embodiments, as shown in FIG. 4B, mitigator 304 may also update the parameters of the machine learning mechanism of DDoS detector/DOTS client 304, in response to determining that client 304 raised a false alarm. In one embodiment, mitigator 304 may use an optimization approach such as stochastic gradient descent with the new labeled data (e.g., the traffic data flagged as benign by mitigator 304), to update the parameters of the detection model. In turn, mitigator 304 may send the machine learning process, its parameters, and/or the newly labeled data to DDoS detector/DOTS client 304 via one or more messages 406. Message(s) 406 may be sent either directly to client 304 or indirectly to client 304 through DOTS server 306, as shown.

Figure 4C:
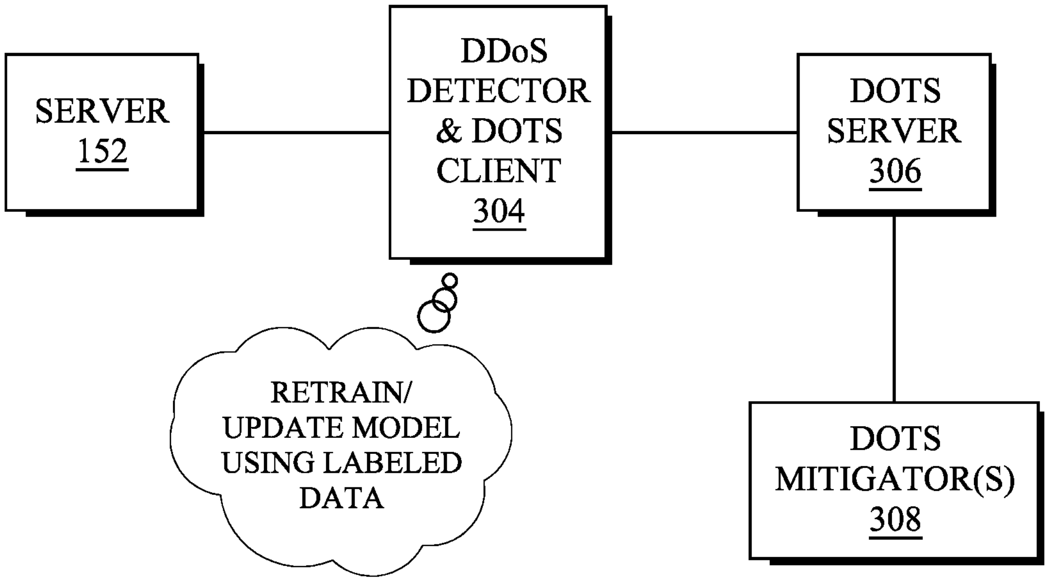

In FIG. 4C, DDoS detector/DOTS client 304 may update its attack detection model using the information received via message(s) 406 from mitigator 304. In one embodiment, client 304 may retrain its machine learning model(s) using labeled data received from mitigator 304 via message(s) 406 (e.g., the traffic data that has been labeled benign by mitigator 304). In another embodiment, client 304 may modify the parameters of its machine learning process using parameters received from mitigator 304. In further embodiments, client 304 may train a new attack detection model using the labeled data included in message(s) 406.

Figure 4D:
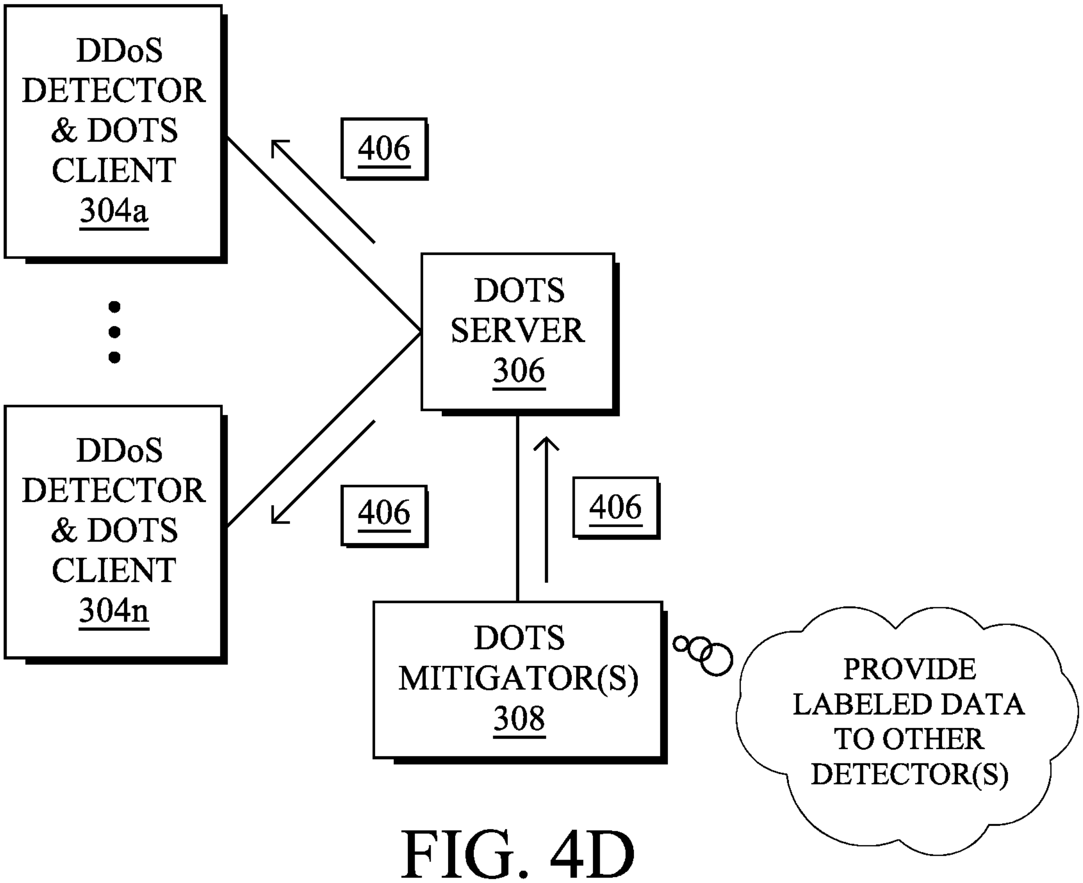

In some cases, as shown in FIG. 4D, the organization making use of DOTS may also agree to share the labeled data from mitigator 304 with authorized third parties. Consider, for example, the case in which there are any number of DDoS detectors/DOTS clients 304*a*-304*n* (e.g., a first through nth detector) operated by any number of different entities. In such cases, mitigator 304 can convey the labeled data via messages 406 to any number of the different clients 304*a*-304*n* either directly in other networks or indirectly via DOTS server 306. For privacy reasons, mitigator 304 may only share labeled encrypted data outside of the original organization. In addition, mitigator 304 may share DDoS attack details with interested and authorized third parties.

Referring now to FIGS. 5A-5D, example techniques are shown to reduce the false negative rate of a network attack detector, according to various embodiments. Generally, false negatives occur when the attack detector incorrectly determines that attack traffic is benign. In the specific case of DOTS, this means that the local DDoS detector/DOTS client 304 will not signal DOTS server 306 for attack mitigation when a false negative occurs, since client 304 believes the traffic to be harmless.

Figure 5A:
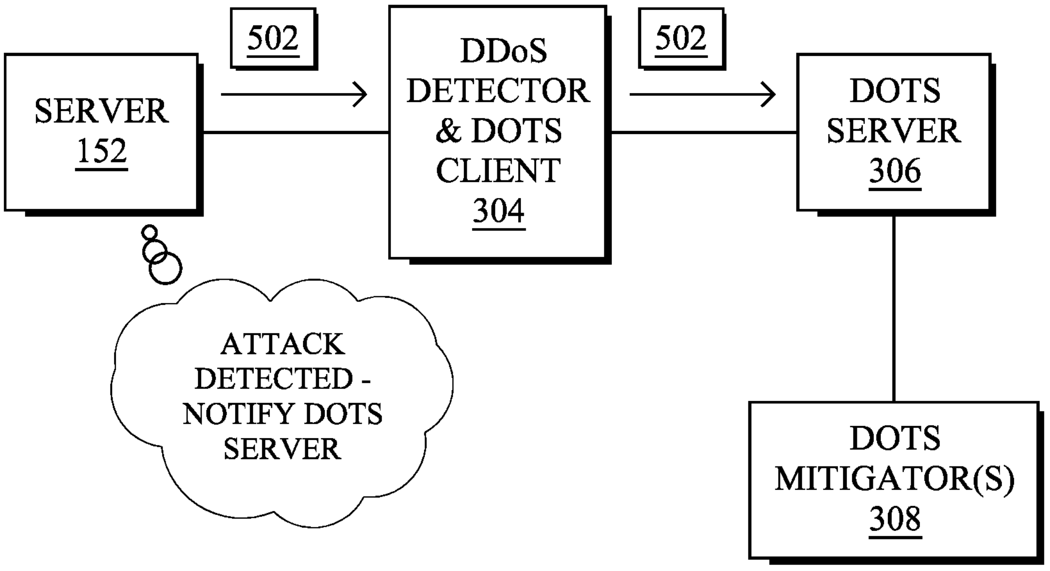
FIGS. 5A-5D illustrate examples of reducing the false negative rate of a network attack detector.

In various embodiments, any number of authorized network resources may be configured to act as a DOTS client for purposes of signaling DOTS server 306 for attack mitigation. For example, as shown in FIG. 5A, consider the case in which the target server 152 is itself a DOTS client. In such a case, server 152 may make its own determination as to whether or not an attack is underway. For example, if the user login time on server 152 has increased significantly, this may indicate that an attack is underway. In turn, server 152 may send message 502 to DOTS server 306 to request attack mitigation.

Since any network device can act as a DOTS client, this also gives way to other mechanisms to identify when DDoS detector 304 produced a false negative. In another embodiment, a user operating a user interface in the network may signal that a potential attack is underway, based on his or her own assessment of the operation of server 152. For example, if a user reports that server 152 is unavailable, an administrator may operate a DOTS client-enabled web portal to convey a mitigation request to DOTS server 504.

Figure 5B:
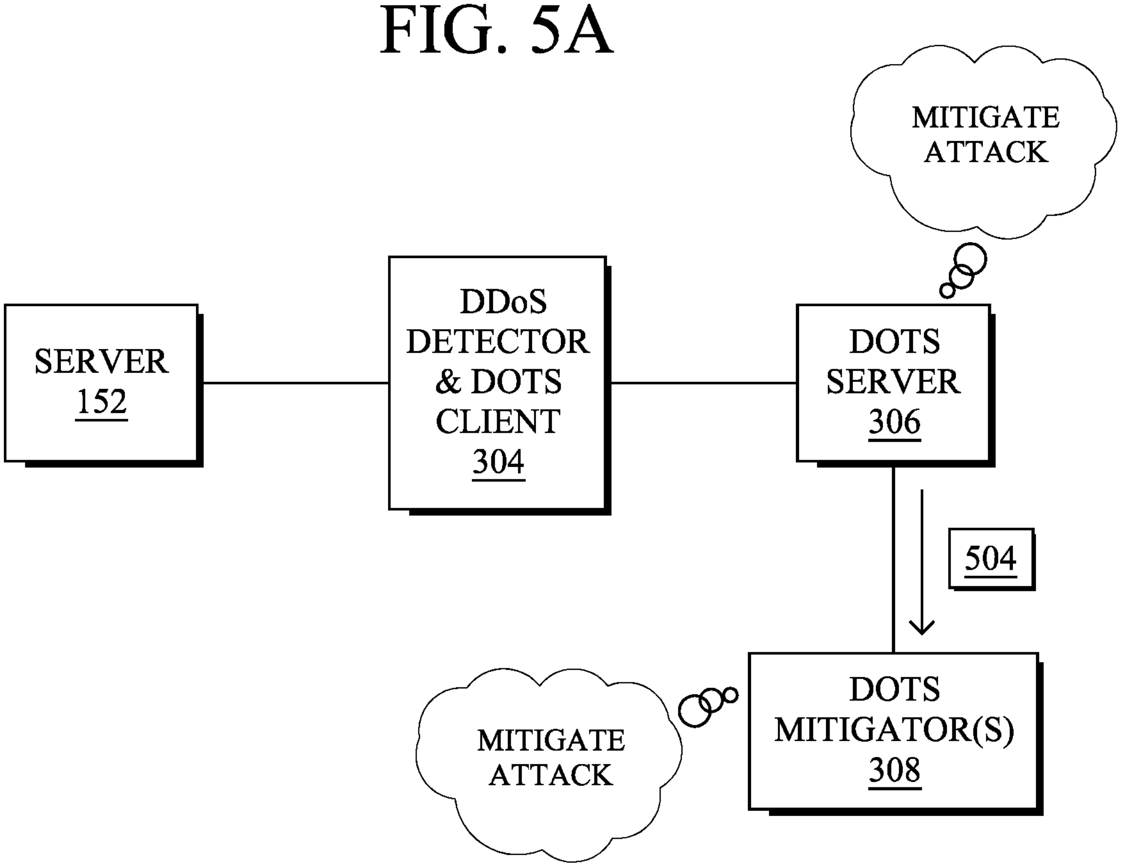

Regardless of the source of the mitigation request from a device other than DDoS detector 304 (e.g., server 152, a user interface, etc.), DOTS server 306 may initiate mitigation in its normal manner. For example, as shown in FIG. 5B, DOTS server 306 may instruct mitigator 304 to mitigate the reported attack via an instruction 504. In turn, the attack traffic destined for target server 152 may be diverted towards mitigator 304 (e.g., using BGP or DNS messaging).

Once the traffic is sent to mitigator 304, mitigator 304 may perform its own analysis of the traffic, to determine whether the traffic is truly part of an attack. For example, mitigator 304 may act as a transparent TLS proxy to decrypt encrypted payloads, perform DPI to inspect traffic payloads and take corrective measures if an attack is detected (e.g., by dropping the traffic, etc.). In this way, mitigator 304 may determine whether DDoS detector/DOTS client 304 failed to detect the attack (e.g., issued a false negative), based on its own analysis of the traffic after mitigation was requested by a source other than DOTS client 304.

Figure 5C:
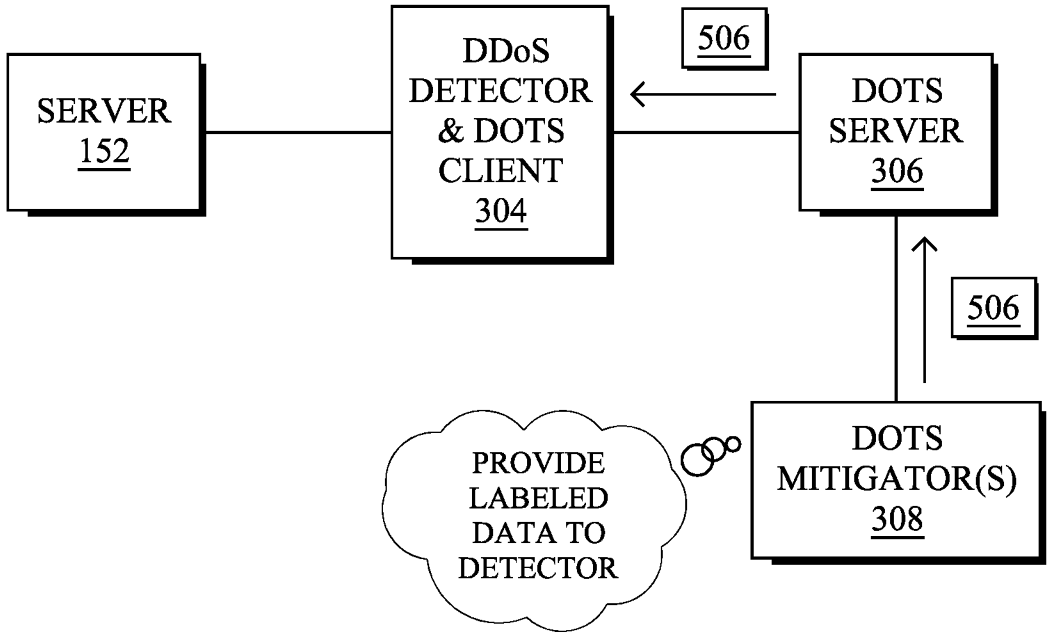

As shown in FIG. 5C, mitigator 304 may send feedback 506 to DOTS server 306 regarding the mitigated attack, thereby confirming to DOTS server 306 that detector/client 304 issued a false negative with respect to the traffic. In turn, DOTS server 306 may send feedback 506 to client 304 thereby informing client 304 that it failed to report the attack. In addition, in various embodiments, mitigator 304 may take similar actions as in the case of a false positive, to cause DDoS detector/DOTS client 304 to update its attack detection model. For example, mitigator 304 may update the parameters of the machine learning mechanism based on its own labeling of the traffic data and using a technique such as stochastic gradient descent. In turn, mitigator 304 may include the updated machine learning process, its parameters, and/or the labeled data via feedback 506 either directly to client 304 or indirectly through DOTS server 306.

Figure 5D:
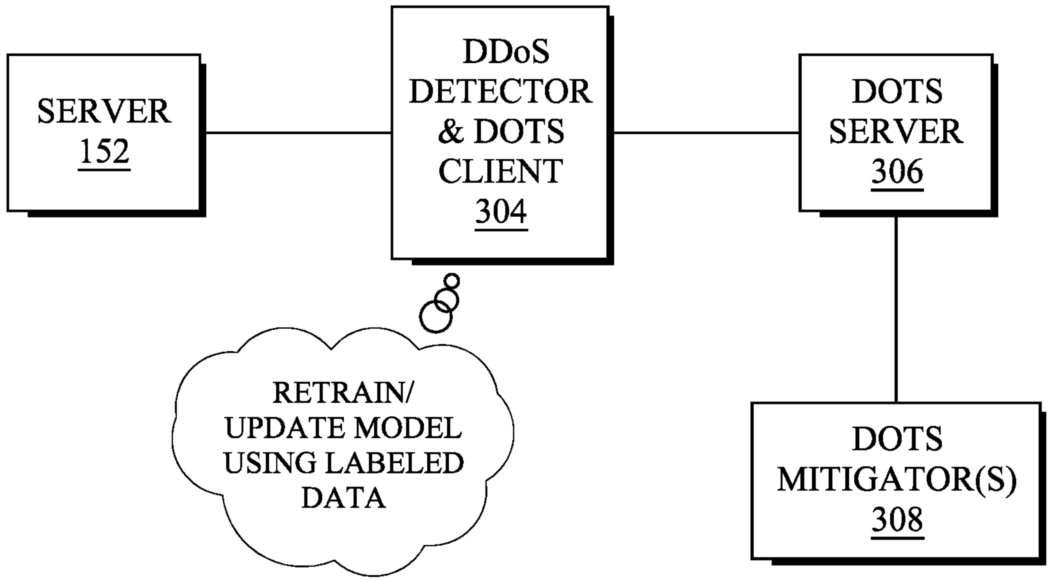

As shown in FIG. 5D, client 304 may use the information in feedback 506 to update its machine learning-based attack detection model(s). For example, client 304 may use the labeled traffic data to retrain its model. In other cases, client 304 may update the parameters of its machine learning process using parameters computed by mitigator 304. In doing so, client 304 will be better able to avoid another false negative in the future. In further embodiments, the feedback 506 may cause client 304 to train and/or install a new attack detection model.

Similar to the information regarding false positives, some implementations also provide for the sharing of false negative information between entities. For example, DOTS server 306 may provide the labeled traffic data, machine learning parameters, etc. that resulted from the false negative to other DOTS clients. If the labeled traffic data is shared outside of the originating entity, the packets may be encrypted, to protect the privacy of the sharing entity.

Figure 6:
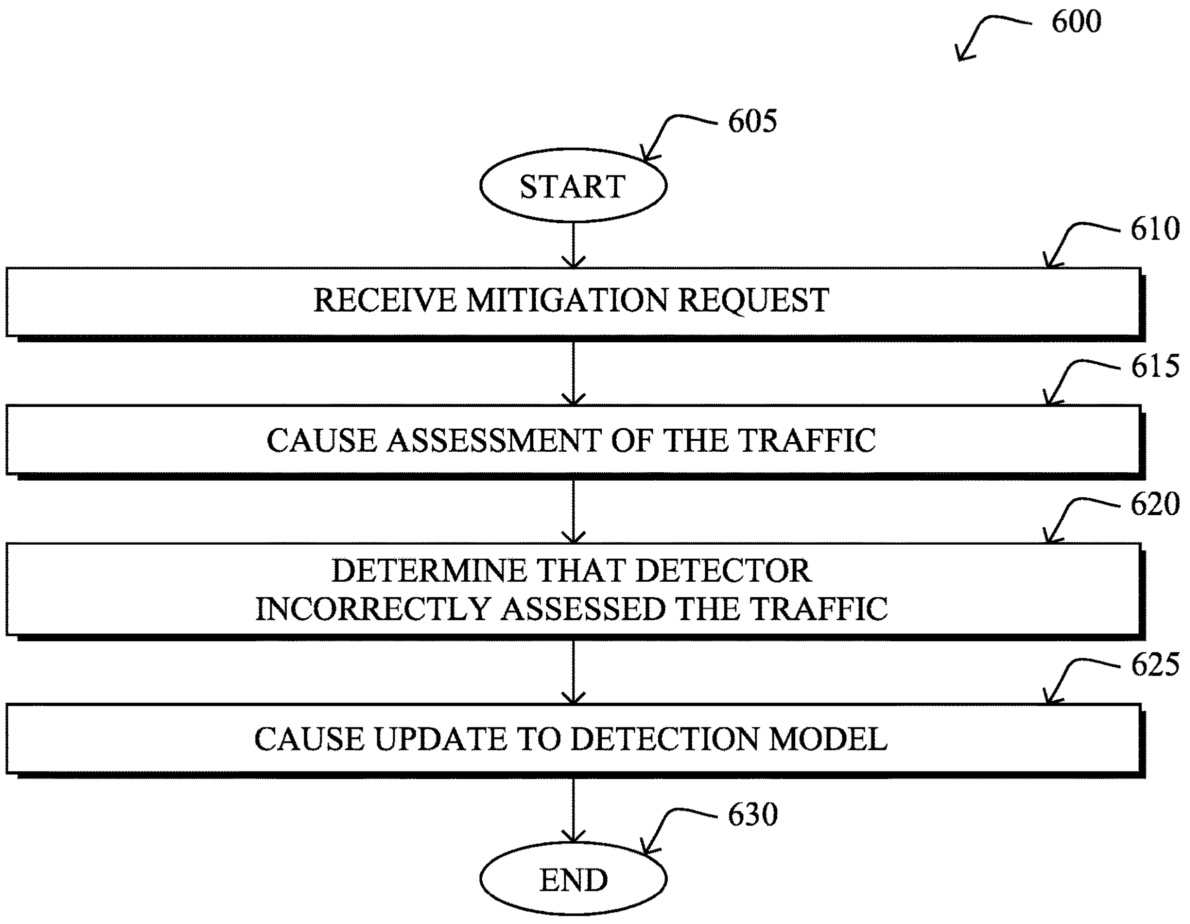
FIG. 6 illustrates an example simplified procedure for the retraining of an attack detection model.

FIG. 6 illustrates an example simplified procedure for the retraining of an attack detection model, in accordance with various embodiments herein. Generally, procedure 600 may be performed by any non-generic, specialized device in a network, such as a device configured to act as an attack mitigator (e.g., a DOTS mitigator) or a supervisory device over such an action (e.g., a DOTS server). Procedure 600 may start at step 605 and continues on to step 610 where, as described in greater detail, the device receives an attack mitigation request regarding traffic in the network. In some embodiments, an attack detector may send the request indicating that the detector determined that an attack is underway. In other embodiments, the request may be sent by any other device in the network (e.g., any other DOTS client besides the attack detector).

At step 615, as detailed above, the device may assess the traffic, in response to receiving the mitigation request. In particular, the device may be configured to perform more robust or heavyweight attack detection on the traffic than the source of the mitigation request. For example, the device may perform DPI on the packets to inspect their payloads, act as a TLS proxy to process encrypted traffic, use more powerful attack detection techniques, or the like, to assess the traffic.

At step 620, the device may determine that an attack detector associated with the attack mitigation request incorrectly assessed the traffic, as described in greater detail above. In particular, based on the assessment of the traffic by the device in step 615, the device may determine whether the deployed attack detector issued either a false positive or a false negative. In the case of a false positive, the attack detector itself may have originated the mitigation request and the device determines that no actual attack exists. Conversely, in the case of a false negative, the device may receive the mitigation request from a source other than that of the attack detector and the device confirms that an attack is present.

At step 625, as detailed above, the device may cause an update to an attack detection model of the attack detector, in response to determining that the attack detector incorrectly assessed the traffic. In some cases, the device may send its labeled traffic data to the attack detector, to allow the attack detector to retrain or update its own model. In further embodiments, the device may compute new machine learning parameters for the attack detector and provide these parameters to the attack detector. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular ordering of the steps is shown, this ordering is merely illustrative, and any suitable arrangement of the steps may be utilized without departing from the scope of the embodiments herein.

The techniques described herein, therefore, automatically retrain machine learning-based DDoS attack detectors, to reduce false positives and false negatives. In addition, the techniques herein can be used with DDoS detectors and mitigators from a variety of different vendors. Further, the techniques herein leverage machine learning, to more effectively make use of limited resources and perform decryption of the packets, which in turn can be used to improve the efficacy of the machine learning process.

While there have been shown and described illustrative embodiments that provide for the automatic retraining of machine learning attack detectors, it is to be understood that various other adaptations and modifications may be made within the spirit and scope of the embodiments herein. For example, while certain embodiments are described herein with respect to using certain mechanisms for purposes of attack detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a mitigation device in a network, an attack mitigation request regarding traffic in the network, wherein the mitigation device is configured to perform a mitigation action on attack traffic in the network;

causing, by the mitigation device, an assessment of the traffic, in response to the attack mitigation request;

determining, by the mitigation device, that an attack detector associated with the attack mitigation request incorrectly assessed the traffic, based on the assessment of the traffic, wherein the attack detector is configured to detect a Distributed Denial of Service (DDoS) attack, and wherein the assessment of the traffic is indicative of either a false positive or a false negative;

determining, by the mitigation device, that the attack mitigation request was received from a) the attack detector when the assessment of the traffic is indicative of a false positive or b) a source other than the attack detector when the assessment of the traffic is indicative of a false negative; and causing, by the mitigation device, an automatic update to an attack detection model of the attack detector based on whether the assessment of the traffic is indicative of a false positive or a false negative, in response to determining that the attack detector incorrectly assessed the traffic.

2. The method as in claim 1, wherein causing, by the device, the automatic update to the attack detection model comprises:

associating, by the device, one or more labels with the traffic, based on the assessment of the traffic by the device; and providing, by the device, the one or more labels to the attack detector to update the attack detection model using the one or more labels.

3. The method as in claim 1, wherein causing, by the device, the automatic update to the attack detection model comprises:

determining, by the device, updated parameters for the attack detection model, based on the assessment of the traffic by the device; and providing, by the device, the updated parameters to the attack detector.

4. The method as in claim 3, wherein the updated parameters for the attack detection model are determined using stochastic gradient descent.

5. The method as in claim 1, wherein the attack detector is a Distributed Denial of Service (DDoS) Open Threat Signaling (DOTS) client.

6. The method as in claim 1, wherein the attack mitigation request is received via a Distributed Denial of Service (DDoS) Open Threat Signaling (DOTS) server.

7. The method as in claim 1, wherein the device is a Distributed Denial of Service (DDoS) Open Threat Signaling (DOTS) attack mitigator.

8. An apparatus, comprising:

one or more network interfaces to communicate with a network;

a processor coupled to the one or more network interfaces and configured to execute one or more processes; and a memory configured to store a process that is executable by the processor, the process when executed operable to:

receive an attack mitigation request regarding traffic in the network, wherein the apparatus is configured to perform a mitigation action on attack traffic in the network;

cause an assessment of the traffic, in response to the attack mitigation request;

determine that an attack detector associated with the attack mitigation request incorrectly assessed the traffic, based on the assessment of the traffic, wherein the attack detector is configured to detect a Distributed Denial of Service (DDoS) attack, and wherein the assessment of the traffic is indicative of either a false positive or a false negative;

determine that the attack mitigation request was received from a) the attack detector when the assessment of the traffic is indicative of a false positive or b) a source other than the attack detector when the assessment of the traffic is indicative of a false negative; and cause an update to an attack detection model of the attack detector, in response to determining that the attack detector incorrectly assessed the traffic.

9. The apparatus as in claim 8, wherein the apparatus causes the update to the attack detection model by:

associating one or more labels with the traffic, based on the assessment of the traffic by the apparatus; and providing the one or more labels to the attack detector to update the attack detection model using the one or more labels.

10. The apparatus as in claim 8, wherein the apparatus causes the update to the attack detection model by:

determining updated parameters for the attack detection model, based on the assessment of the traffic by the apparatus; and providing the updated parameters to the attack detector.

11. The apparatus as in claim 10, wherein the updated parameters for the attack detection model are determined using stochastic gradient descent.

12. The apparatus as in claim 8, wherein the attack detector is a Distributed Denial of Service (DDoS) Open Threat Signaling (DOTS) client.

13. The apparatus as in claim 8, wherein the attack mitigation request is received via a Distributed Denial of Service (DDoS) Open Threat Signaling (DOTS) server.

14. The apparatus as in claim 8, wherein the apparatus is a Distributed Denial of Service (DDoS) Open Threat Signaling (DOTS) attack mitigator.

15. A tangible, non-transitory computer-readable medium that stores program instructions configured to cause a device in a network to execute a process comprising:

receiving, at the mitigation device, an attack mitigation request regarding traffic in the network, wherein the mitigation device is configured to perform a mitigation action on attack traffic in the network;

causing, by the mitigation device, an assessment of the traffic, in response to the attack mitigation request;

determining, by the mitigation device, that an attack detector associated with the attack mitigation request incorrectly assessed the traffic, based on the assessment of the traffic, wherein the attack detector is configured to detect a Distributed Denial of Service (DDoS) attack, and wherein the assessment of the traffic is indicative of either a false positive or a false negative;

determining, by the mitigation device, that the attack mitigation request was received from a) the attack detector when the assessment of the traffic is indicative of a false positive or b) a source other than the attack detector when the assessment of the traffic is indicative of a false negative; and causing, by the mitigation device, an update to an attack detection model of the attack detector based on whether the assessment of the traffic is indicative of a false positive or a false negative, in response to determining that the attack detector incorrectly assessed the traffic.

16. The tangible, non-transitory computer-readable medium as in claim 15, wherein the attack mitigation request indicates that the traffic is associated with a Distributed Denial of Service (DDoS) attack.

* * * * *